(12) United States Patent
Pan et al.

(10) Patent No.: US 7,843,353 B2
(45) Date of Patent: Nov. 30, 2010

(54) AUTOMATIC LIGHTING CONTROL SYSTEM AND METHOD

(75) Inventors: Meng-Shiuan Pan, Yilan (TW); Yen-Ann Chen, Taipei (TW); Ting-Chou Chien, Taipei (TW); Yueh-Feng Lee, Taipei (TW); Yu-Chee Tseng, Hsinchu (TW)

(73) Assignee: Industrial Technology Reseacrh Institute, Hsinchu (TW)

( * ) Notice: Subject to any disclaimer, the term of this patent is extended or adjusted under 35 U.S.C. 154(b) by 324 days.

(21) Appl. No.: 11/950,429

(22) Filed: Dec. 5, 2007

(65) Prior Publication Data

US 2009/0072945 A1 Mar. 19, 2009

(30) Foreign Application Priority Data

Sep. 13, 2007 (TW) .............................. 96134203 A

(51) Int. Cl.
*G08B 17/12* (2006.01)
(52) U.S. Cl. ........................... 340/600; 315/158; 700/12
(58) Field of Classification Search ................ 340/600, 340/641, 642, 332; 315/149–159; 700/12
See application file for complete search history.

(56) References Cited

U.S. PATENT DOCUMENTS

| | | | | | |
|---|---|---|---|---|---|
| 3,609,451 | A | * | 9/1971 | Edgerly et al. ............... | 315/151 |
| 4,233,545 | A | * | 11/1980 | Webster et al. ............... | 315/154 |
| 4,368,406 | A | | 1/1983 | Kruzich et al. .............. | 315/158 |
| 5,489,827 | A | * | 2/1996 | Xia ............................. | 315/154 |
| 6,404,079 | B1 | | 6/2002 | Hsieh .......................... | 307/117 |
| 6,548,967 | B1 | | 4/2003 | Dowling et al. ............. | 315/318 |
| 6,803,728 | B2 | * | 10/2004 | Balasubramaniam et al. ........................ | 315/149 |
| 6,990,394 | B2 | | 1/2006 | Pasternak ................... | 700/295 |
| 7,053,767 | B2 | | 5/2006 | Petite et al. ................. | 340/531 |
| 7,386,421 | B2 | * | 6/2008 | Miki .......................... | 702/183 |
| 2007/0189001 | A1 | * | 8/2007 | Nielson et al. ................ | 362/16 |
| 2007/0244572 | A1 | * | 10/2007 | Farr ............................ | 700/12 |
| 2008/0039113 | A1 | * | 2/2008 | Liu et al. .................. | 455/456.1 |
| 2008/0191630 | A1 | * | 8/2008 | Peng .......................... | 315/158 |
| 2009/0273287 | A1 | * | 11/2009 | Segall ........................ | 315/152 |

FOREIGN PATENT DOCUMENTS

TW 311674 7/1997
TW M284176 12/2005

OTHER PUBLICATIONS

Intelligent Light Control Using Sensor Networks, James H. Garrett Jr. & H. Scott Matthews, SenSys'05, Nov. 2-4, 2005.
Design and Implementation of a Wireless Sensor Network for Intelligent Light Control, Heemin Park, Jeff Burke & Mani B. Srivastava, IPSN'07, Apr. 25-27, 2007.

* cited by examiner

*Primary Examiner*—John A Tweel, Jr.

(57) ABSTRACT

An automatic lighting control system includes at least a lighting device, at least a sensor, and a decision module. Each lighting device is adjustable and has a remote control function. A wireless sensor network is configured by the one or more sensors. Each sensor may sense a corresponding luminance and returns the luminance to the decision module in a wireless manner. The decision module may dynamically adjust one or more lighting devices to a suitable luminance by referring to system information, the returned luminance and user's demands.

10 Claims, 11 Drawing Sheets

| ACTIVITY | LUMINANCE DEMANDS FOR GENERAL LIGHTING DEVICE | LUMINANCE DEMANDS FOR LOCAL LIGHTING DEVICE | LUMINANCE EFFECT EXTENT |
|---|---|---|---|
| READING | [300, 500] | [900, 1100] | 3 VIRTUAL GRIDS |
| TYPING | [200, 400] | [900, 1000] | 5 VIRTUAL GRIDS |
| WATCHING TV | [300, 400] | x | 7 VIRTUAL GRIDS |
| DINING | [200, 300] | x | 2 VIRTUAL GRIDS |
| ... | ... | ... | ... |

| ACTIVITY | LUMINANCE DEMANDS FOR GENERAL LIGHTING DEVICE | LUMINANCE DEMANDS FOR LOCAL LIGHTING DEVICE | LUMINANCE EFFECT EXTENT |
|---|---|---|---|
| READING | [300, 500] | [900, 1100] | 3 VIRTUAL GRIDS |
| TYPING | [200, 400] | [900, 1000] | 5 VIRTUAL GRIDS |
| WATCHING TV | [300, 400] | x | 7 VIRTUAL GRIDS |
| DINING | [200, 300] | x | 2 VIRTUAL GRIDS |
| ... | ... | ... | ... |

FIG. 5

AUTOMATIC LIGHTING CONTROL SYSTEM AND METHOD

FIELD OF THE INVENTION

The present invention generally relates to an automatic lighting control system and method.

BACKGROUND OF THE INVENTION

An over-lit and under-lit environment tires the eyes, and may even cause damages to the eyes. Therefore, the appropriate luminance in an environment to prevent eyes from fatigue is an important issue. A Central Standard Bureau defines regulations on the required illumination for different occasions. For example, the illumination for a classroom is 200-750 Lux, 300-1500 Lux for the blackboard, more than 500 Lux for the desk top, 750-1500 Lux for offices and designing room, and 75-150 Lux for the break room and warehouse.

In addition to the sufficient illumination, the distribution of the illumination is also important, called the uniformity of luminous brightness distribution. The more uniformly distributed the light, the less stress on the eyesight. Therefore, how to provide a comfortable environment with appropriate and balanced lighting of general ambient lighting, such as ceiling light, and local lighting, such as table lamps, is an important issue.

Taiwan Patent No. M284176 disclosed a lighting apparatus integrating illumination sensor and light emitting diode (LED) as a light source. The LED and sensor are wired together. The apparatus uses the sensor to sense the ambient illumination, transmits the detected illumination to the apparatus, and adjusts the current to control the illumination of the LED.

U.S. Pat. No. 6,548,967 disclosed universal lighting network methods and systems. The lighting devices of the lighting network systems are all adjustable and controlled by a control center. The control center uses a wired network to transmit the control signals. The lighting devices may include a plurality of sensors, and monitor the environment. The disclosed patent neither teaches how the control center controls the lighting devices nor how the user's demand can be taken into account in adjusting the lighting.

Proc. Of ACM Int'; Conference on Embedded Networked Sensor Systems, 2005 disclosed a paper entitled "Intelligent light control using sensor networks". The paper disclosed a lighting control system using a wireless sensing technology. The system takes the user's demands and energy-saving concerns into account. The user may define the lighting preference. In the disclosure, only a lighting control device is considered, and the lighting control method for the device must know in advance of all the relation between lighting calibration level and illumination. The lighting control result may not meet all the user's demands in this case.

SUMMARY OF THE INVENTION

In the exemplary embodiments, the present disclosure may provide an automatic lighting control system and luminance control method.

In an exemplary embodiment, the present disclosure is directed to an automatic lighting control system, comprising at least a lighting device, at least a sensor, and a decision module. Each lighting device is adjustable and provides a remote control function. A wireless sensor network is configured by the one or more sensors. Each sensor may sense a corresponding luminance and returns the luminance to the decision module in a wireless manner. The decision module may dynamically adjust each lighting device to a suitable luminance by referring to system information, the returned luminance and user's demands.

In another exemplary embodiment, the present disclosure is directed to a method for controlling luminance in an automatic lighting control system. The method is applicable to a system environment where a user moves or changes the demands of lighting. The method comprises the steps of detecting the luminance of the system environment through at least a sensor and reporting to a decision module; determining the luminance of the one or more lighting devices of the system environment through the decision module; and remotely adjusting luminance for each of the one or more lighting devices.

In yet another exemplary embodiment, the present disclosure is directed to a method for controlling luminance in an automatic lighting control system. The method is applicable to a system environment where a user moves or changes the demands of lighting. The method comprises the steps of storing system information, user information, and returned luminance from at least a sensor; determining the luminance of at least a general lighting device of the system environment; dynamically adjusting each of the general lighting devices; determining the luminance of at least a local lighting device of the system environment and adjusting each of said at least a local lighting device; receiving the luminance detected by each of said at least a sensor, and determining whether a corresponding threshold is achieved; and if not, repeating the above steps.

According to the present disclosure, the decision module may consider a plurality of factors affecting the environment lighting brightness, such as the weight of each lighting device to each sensor, system environment information, user demands, and the information on the influence range of the lighting devices, and so on, to determine the most suitable light source. In addition, a linear programming technique may be used to meet the demands for each user and determine the minimum required luminance for each user.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 5 shows an exemplary pre-stored system information for different users' activities, including luminance demands and the luminance effect extent for general lighting devices and local lighting devices.

DETAILED DESCRIPTION OF THE PREFERRED EMBODIMENTS

Figure 1:
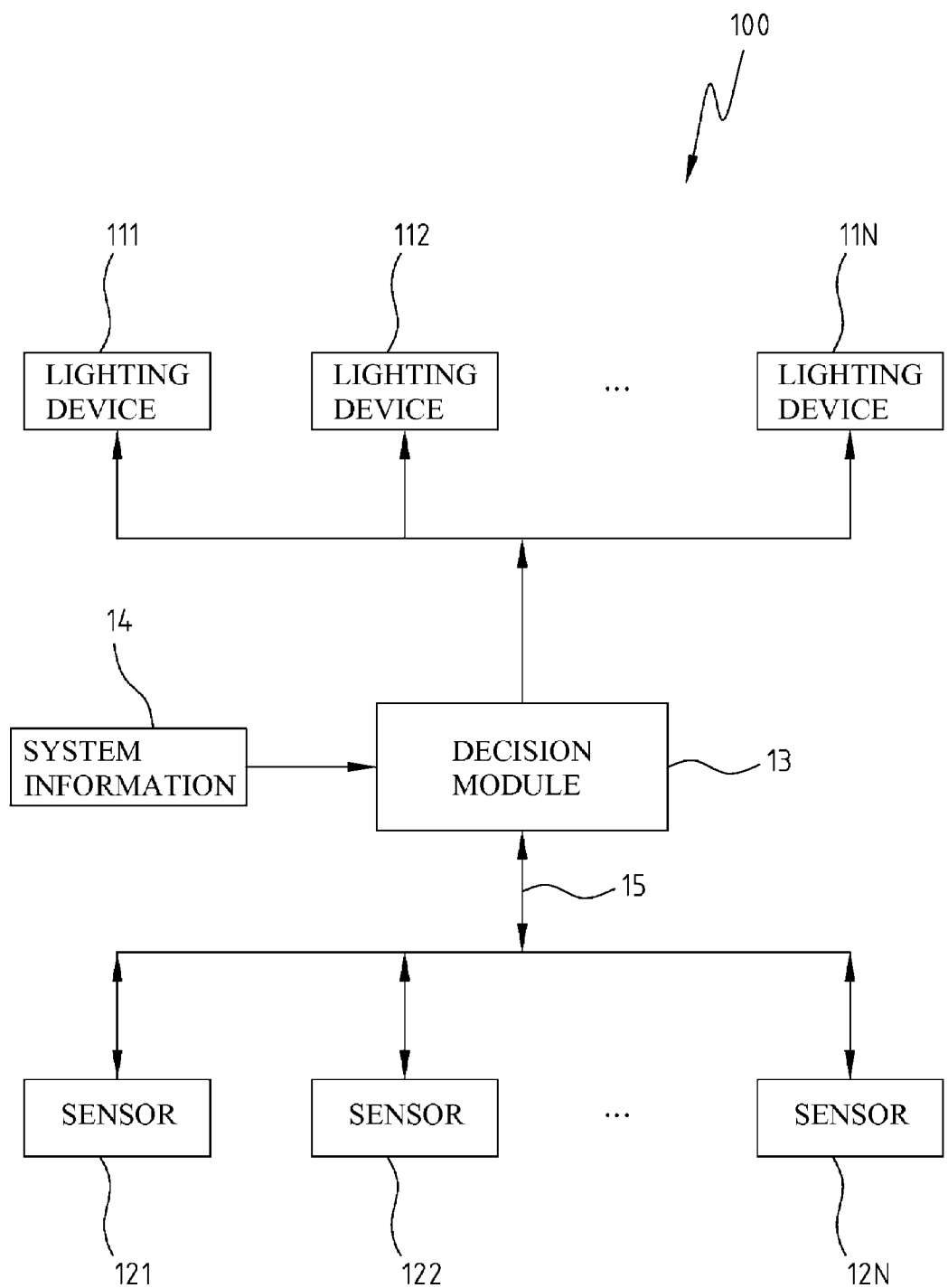
FIG. 1 shows a schematic view of an exemplary automatic lighting control system, consistent with certain embodiments of the present disclosure.

FIG. 1 shows a schematic view of an exemplary automatic lighting control system, consistent with certain embodiments of the present disclosure. Referring to FIG. 1, automatic lighting control system 100 may comprise at least a lighting device 111-11N, at least a sensor 121-12N, and a decision module 13. Each of lighting devices 111-11N is adjustable, and has a remote control function. Sensors 121-12N are automatically configured as a wireless sensor network to detect the luminance for a system environment and to report the luminance to a decision module 13 through a wireless network 15. Decision module 13 dynamically adjusts each of lighting devices 111-11N to a suitable luminance based on system information, the reported luminance from sensors 121-12N, and the users' demands. The suitable luminance for each lighting device may allow the users to feel comfortable environmental lighting sources.

Decision module 13 may adjust and control lighting devices 111-11N by a remote dynamic decision mode, for example, through wires or wireless medium, such as wired or wireless network, to remotely control the luminance for each of lighting devices 111-11N.

System information 14 may be pre-stored in the decision module 13. System information 14 may include information on each lighting device, the relative weight of each lighting device to each sensor, system environment information, required luminance for user's activities, and the affecting range of lighting device, and so on. The required luminance for user's activities may refer to the standard regulation. The required luminance for user's activities may also define a range of light intensity for the required luminance.

In the present disclosure, lighting devices may be classified as two kinds. One kind of lighting devices is general lighting devices, such as fluorescent light, floor lamp, and so on. The other kind of lighting devices are local lighting devices, such as desk lamp, reading lamp, and so on. The general lighting device may be used for illuminating a global environment, and the local lighting device may be used for meeting the luminance for a specific spot. Sensors 121-12N may be fixed sensors or portable sensors.

The fixed sensors may be placed at a plurality of virtual grids formed by dividing the system environment to detect the luminance corresponding to the virtual grids. For example, a fixed sensor may be embedded in small furniture or a decorative piece, and placed at a fixed location in the environment. The luminance detected by each fixed sensor may represent the luminance of an area. Fixed sensors may also report the luminance to decision module 13 periodically. Portable sensors may be embedded in portable items, such as eyeglasses, bookmarks, and cell phones. Portable sensors are small in size for portability, may allow the user to enter the required luminance according to the user's activity, such as reading, sleeping, and so on, and may also detect light intensity.

The dynamically configured wireless sensor network may provide the user positioning function, which may be used to locate a user's location so that decision module 13 may determine the luminance according to the location. Decision module 13 may also adjust the luminance according to the user activity. The adjusting process may also take the interaction among multiple users into account.

Figure 2:
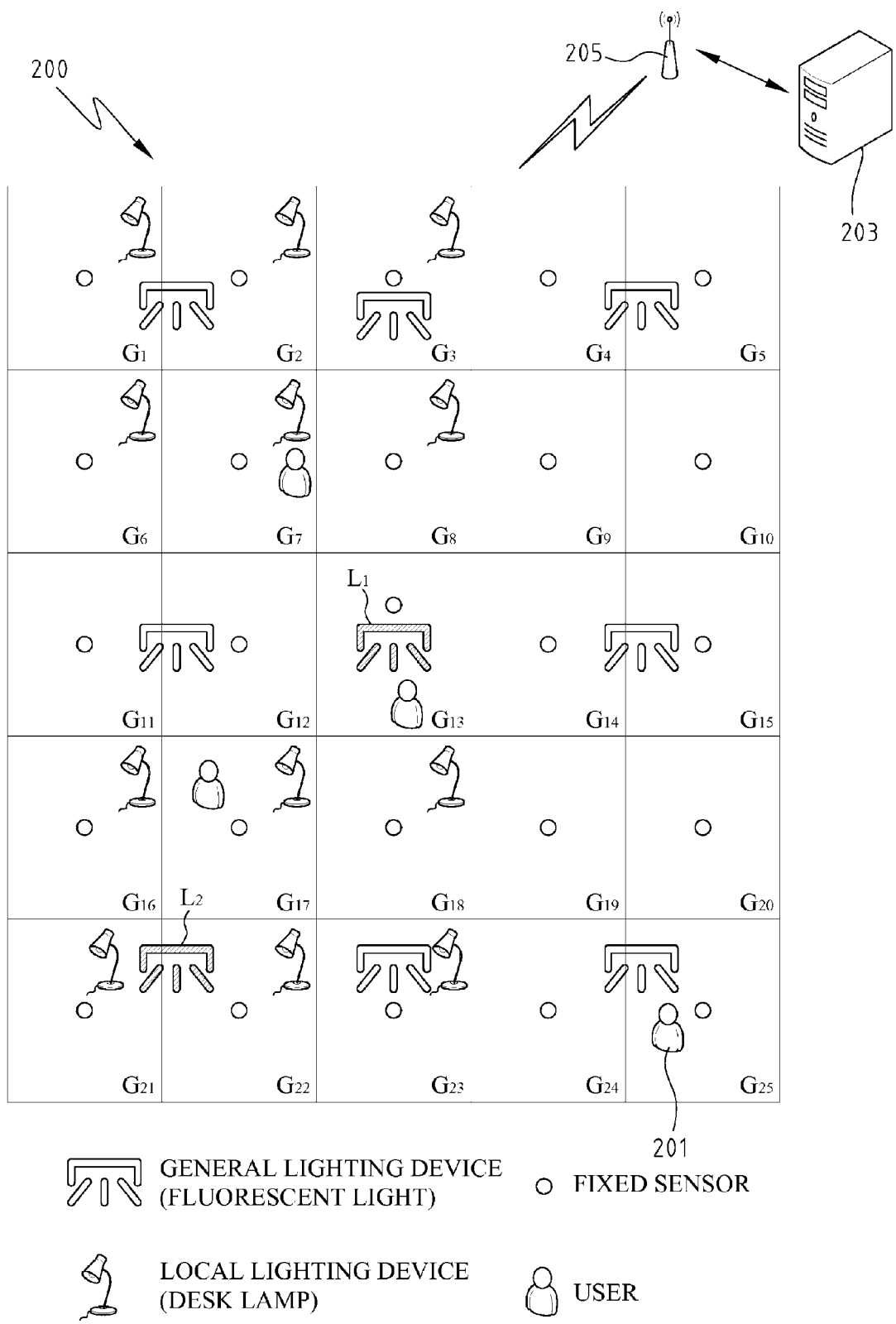
FIG. 2 shows an exemplary automatic lighting control system environment, consistent with certain embodiments of the present disclosure.

FIG. 2 shows an exemplary automatic lighting control system environment, consistent with certain embodiments of the present disclosure. Referring to FIG. 2, the exemplary lighting devices in the system environment may include general lighting devices, such as fluorescent light, and local lighting devices, such as desk lamp. Decision module 203 may be a remote server or a PC. System environment 200 is divided into 25 virtual grids $G_1$-$G_{25}$, with each virtual grid including a fixed sensor. Each fixed sensor may detect the local luminance for each virtual grid, and periodically report the detected luminance to decision module 203. The portable sensor carried by a user reports not only the luminance surrounding the user, but also the user's current location. For example, the portable sensor on user 201 may use the positioning technology to report to the decision module that user 201 is in virtual grid $G_{25}$.

Through the wireless sensor network consisting of fixed sensors and portable sensors, the information is reported to a data sink 205 in a wireless multihop manner. Data sink 205 then reports the information to decision module 203.

A general lighting device may affect a plurality of virtual grids; for example, fluorescent light $L_1$ located in central grid $G_{13}$ may affect the luminance detected by the fixed sensors in virtual grids $G_7$, $G_8$, $G_9$, $G_{12}$, $G_{13}$, $G_{14}$, $G_{17}$, $G_{18}$, and $G_{19}$. Fluorescent light $L_2$ may affect the luminance detected by the fixed sensors in virtual grids $G_{16}$, $G_{17}$, $G_{21}$, and $G_{22}$. As the light decays as the distance increases, the effect extent (i.e., relative weight) of general lighting devices and local lighting devices on the sensors in the virtual grids may be known when constructing the system. Assume that each fixed sensor has the same vertical distance S from the ceiling. For example, a general lighting device has a relative weight of 0.7 on the luminance for virtual grid $G_j$. This means that the luminance detected by the sensor in virtual grid $G_j$ is 70% of the luminance detected by a sensor underneath the general lighting device. The luminance of a general lighting device defined by the present disclosure is the luminance at the location underneath the general lighting device with the vertical distance S.

According to the luminance decay experiments, the decay is a linear relation regardless of the current illumination. Therefore, the weight of each general lighting device on each virtual grid may be recorded in a matrix W according to the present disclosure. Matrix W may be used to obtain the current luminance provided by the general lighting devices. Assume that the location of each general lighting device is known, and the location information may be used to obtain m corresponding rows from matrix W to construct a matrix W'. If the luminance of the sensor at the general devices is recorded in a matrix $\hat{S}'$, and the luminance provided by the general lighting devices is represented by variable $L_{wd}^c$, the relation between the luminance detected by the sensors and the luminance weight of the general lighting devices may be expressed as $$\hat{S}' = W' L_{wd}^c,$$

where $\hat{S}^f$ is a k×l matrix for recording the luminance detected by the fixed sensors of the system, and k is the number of virtual grids. W' is a k×m matrix for recording the weight of the general lighting devices on the virtual grids, and m is the number of general lighting devices. $L_{wd}^c$ is an m×l matrix for recording the luminance of the general lighting devices.

Figure 3:
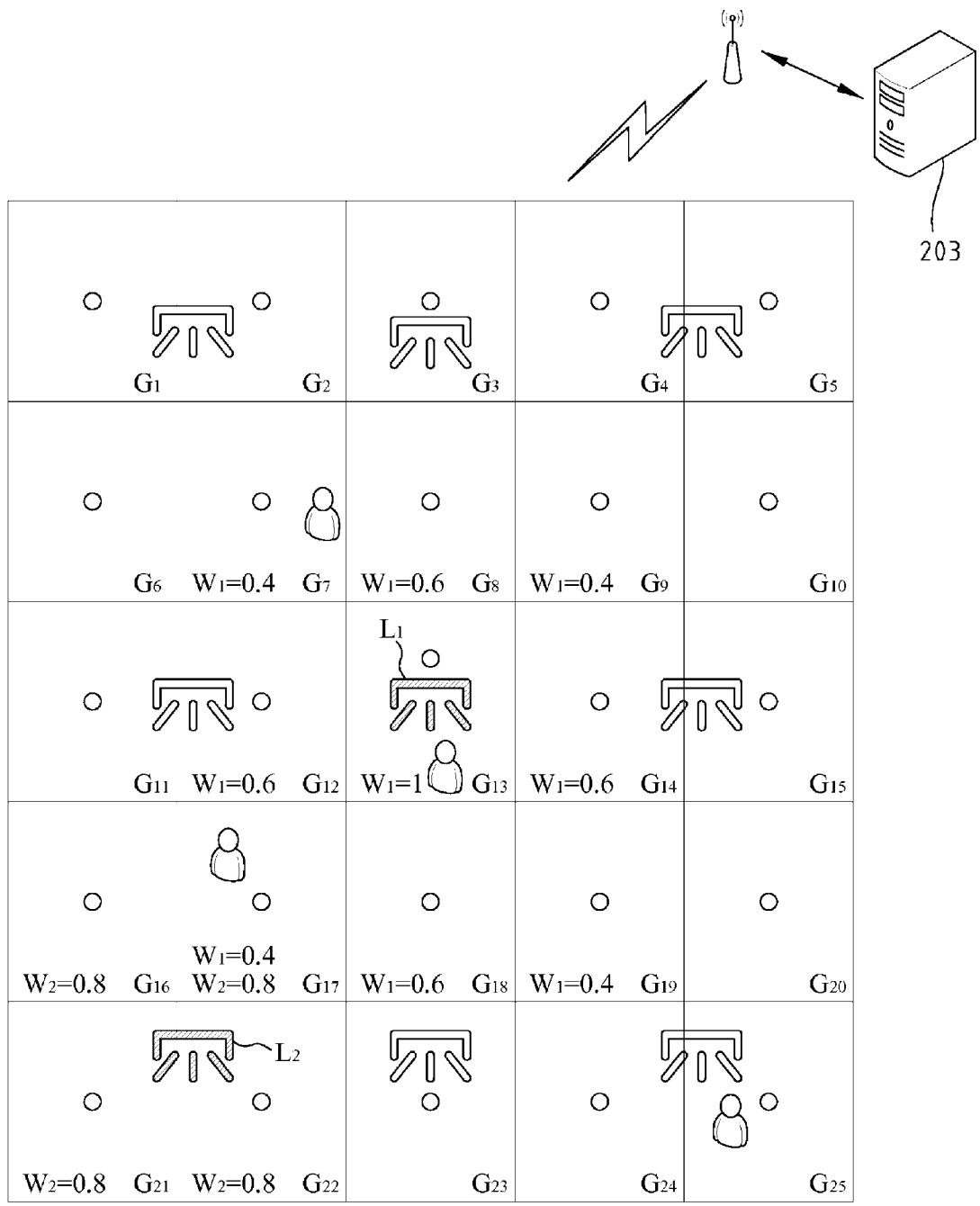
FIG. 3 shows a schematic view of an exemplary computation for adjusting the lighting device's luminance.

FIG. 3 shows a schematic view of an exemplary computation for adjusting the lighting device's luminance. Referring to FIG. 3, general lighting device $L_1$ in virtual grid $G_{13}$ has the following weights on the surrounding virtual grids: $W_1=1$ for virtual grid $G_{13}$; $W_1=0.6$ for virtual grids $G_8$, $G_{12}$, $G_{18}$, $G_{14}$; $W_1=0.4$ for virtual grids $G_7$, $G_9$, $G_{17}$, $G_{19}$. General lighting device $L_2$ has the following weights on the surrounding virtual grids: $W_2=0.8$ for virtual grids $G_{16}$, $G_{17}$, $G_{21}$, $G_{22}$. When a user is in virtual grid $G_{17}$ and demands 520 Lux for working, it means that the luminance detected by the sensor in $G_{17}$ needs be 520 Lux.

When general lighting device $L_1$ is turned on, the fixed sensor in virtual grid $G_{13}$ detects a luminance of 500 Lux, represented by $l_1=500$. General lighting devices $L_1$, $L_2$ have effect on virtual grid $G_{17}$. Decision module 203 may adjust the luminance $l_2$ of general lighting device $L_2$ through the computation for combined equations of $l_1=500$ and $0.4*l_1+0.8*l_2=520$ to obtain that $l_1=500$ and $l_2=400$.

Therefore, through the wireless network, decision module 203 may adjust luminance $l_2$ of general lighting device $L_2$ to 400 Lux so that the fixed sensor in virtual grid $G_{17}$ may detect a luminance of 520 Lux to meet the user's demands. When a natural light, such as sunlight, appears in virtual gird $G_{17}$, the fixed sensor in virtual grid $G_{17}$ will detect a luminance higher than 520 Lux. At this point, decision module 203 will adjust luminance $l_2$ of general lighting device $L_2$ to a lower value to meet the demands at 520 Lux.

Figure 4:
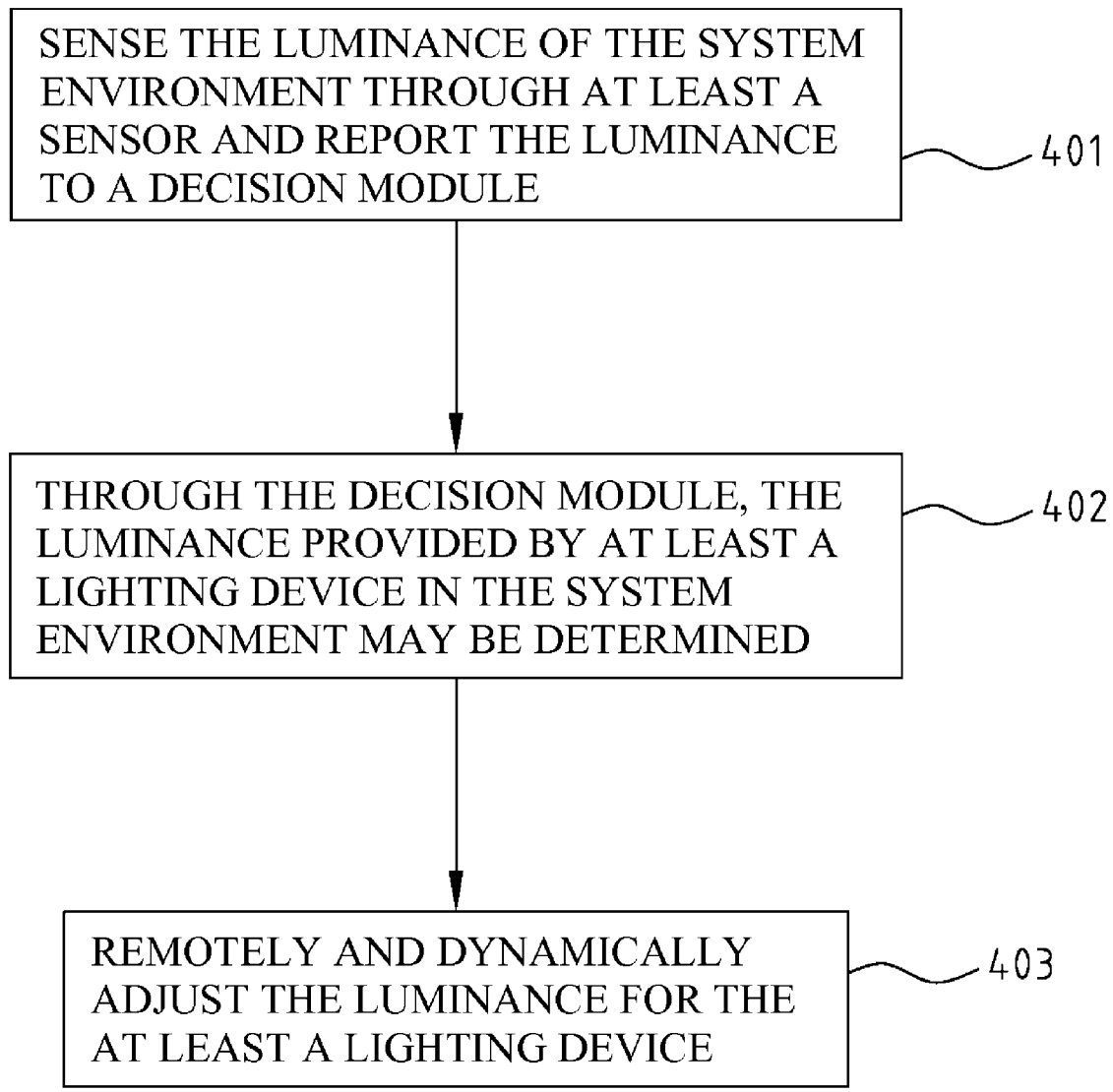
FIG. 4 shows a flowchart illustrating an exemplary method for controlling luminance for an automatic lighting control system, consistent with certain embodiments of the present disclosure.

FIG. 4 shows a flowchart illustrating an exemplary method for controlling luminance for an automatic lighting control system, consistent with certain embodiments of the present disclosure. The exemplary method may be applied to a system environment where the user moves or the demands change. Referring to FIG. 4, step 401 is to sense the luminance of the system environment through at least a sensor and report the luminance to a decision module. Through the decision module, the luminance provided by at least a lighting device in the system environment may be determined, as shown in step 402. In step 403, the decision module may remotely and dynamically adjust the luminance for the at least a lighting device. The decision module may determine the target threshold of the luminance for the at least a lighting device according to the pre-constructed and pre-stored system information.

FIG. 5 shows exemplary pre-stored system information for different users' activities. The exemplary pre-stored system information may include luminance demands and the luminance effect extent for general lighting devices and local lighting devices. Referring to FIG. 5, the system information includes activities (such as reading, typing, watching TV, and dining), the demands of luminance of the general lighting devices, (such as 300-500 Lux for reading, the demands of local lighting devices, such as 900-1000 Lux for typing), and luminance effect extent (such as seven virtual grids surrounding the user for watching TV).

Figure 6:
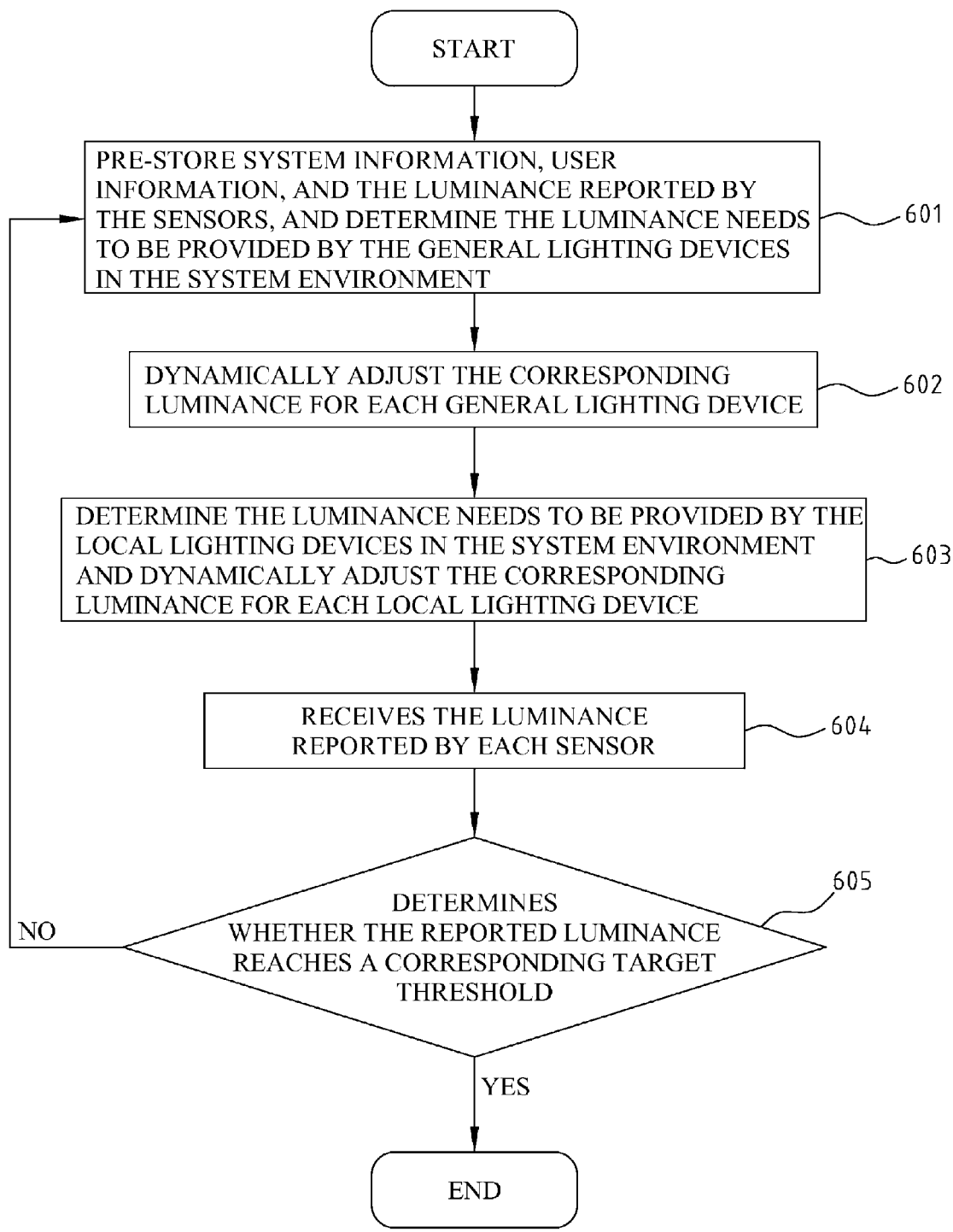
FIG. 6 shows a flowchart illustrating another exemplary method for controlling luminance, consistent with certain embodiments of the present disclosure.

FIG. 6 shows a flowchart illustrating another exemplary method for controlling luminance, consistent with certain embodiments of the present disclosure. The exemplary method may be applied to a system environment where the user moves or changes the demands. The method may adjust the local lighting according to the user's demands to enhance the lighting for the user. Local lighting device may be available for some user.

When the user moves or changes the demands in a system environment, the fixed or portable sensors may apply the wireless network positioning technology and report the location and activity of the user to the decision module. Referring to FIG. 6, in step 601, the decision module may pre-store system information, user information, and the luminance reported by the sensors, and may determine the luminance needs to be provided by the general lighting devices in the system environment. The decision module may dynamically adjust the corresponding luminance for each general lighting device, as shown in step 602.

In step 603, the decision module may determine the luminance needs to be provided by the local lighting devices in the system environment and may dynamically adjust the corresponding luminance for each local lighting device. In step 604, the decision module receives the luminance reported by each sensor. The decision module also determines whether the reported luminance reaches a corresponding target threshold, as shown in step 605. If a reported luminance does not reach its corresponding target threshold, all the above steps are repeated. In other words, the decision module will repeat the steps 601-605 until the target threshold is reached.

The decision module may apply an adaptive decision algorithm to determine the luminance adjustment for the general lighting devices and local lighting devices respectively. The decision module, based on the pre-constructed system information, may define a range $[D_{wd}^l(i), D_{wd}^u(i)]$ for the demands of each user i on the luminance of general lighting devices. According to the aforementioned luminance decay experiments, the luminance adjustment for general lighting devices may be defined as a linear program equation. The following are two exemplary defined parameters:

$$X_m = [1\ 1\ \ldots\ 1]_{l \times m} \quad (A)$$

$$R_i = [r_i(G_1)\ r_i(G_2)\ \ldots\ r_i(G_k)]^T \quad (B)$$

where $X_m$ is an l×m constant matrix, m is the number of the general lighting devices, $R_i$ is a k×l matrix for recording whether user i affects the luminance of virtual grids $G_1$-$G_k$, k is the number of virtual grids. If user i affects virtual grid $G_j$, the j-th matrix element is 1. The above parameter (B) may further construct a new matrix:

$$\overline{R}_i = \begin{bmatrix} r_i(G_1) & 0 & \ldots & 0 \\ 0 & r_i(G_2) & \ldots & 0 \\ \vdots & \vdots & \ldots & 0 \\ 0 & 0 & 0 & r_i(G_k) \end{bmatrix} \quad (C)$$

Referring to the above parameters (A), (B), and (C), the object for adjusting the general lighting devices is to reduce the energy consumption while meeting the user's demands; i.e., satisfying the following equation (1):

$$\min X_m(A_{wd} + L_{wd}^c) \quad (1)$$

where $A_{wd}$ is an m×l matrix for representing the required luminance for the general lighting devices, $L_{wd}^c$ is an m×l matrix for recording the current luminance for the general lighting devices. The meaning of equation (1) is to ensure that after the required luminance of the general lighting devices is added to the current luminance, the luminance provided by the lighting devices may meet the minimum demands of the user. In other words, the most energy-saving state is achieved.

Equation (2) is a linear programming equation. The luminance solved by the linear programming equation must satisfy the demands of each user, and the luminance provided by the general lighting devices must be within the range $[D_{wd}^l(i), D_{wd}^u(i)]$ of demands for user i. Equation (3) is to limit the illumination range of the general lighting devices.

$$D_{wd}^l(i) \cdot R_i \leq R_i \cdot (S^f + WA_{wd}) \leq D_{wd}^u(i) \cdot R_i \ \forall i \in [1,n] \quad (2)$$

$$0 \leq A_{wd} + L_{wd}^c \leq L_{wd}^{max} \quad (3)$$

where $S^f$ is a k×l matrix for recording the luminance detected by the fixed sensors of the system, W is a k×m matrix for recording the effect extent of the general lighting devices on the virtual grid, m is the number of the general lighting devices, k is the number of the grid, and $L_{wd}^{max}$ is an m×l matrix for recording the maximum luminance of the general lighting devices.

Similarly, for adjusting the local lighting devices, the range of demands $[D_{ld}^l(i), D_{ld}^u(i)]$ for each user i on the luminance of the local lighting devices may be defined in advance. The provision of the local lighting to user i is to use the portable sensor carried by the user to detect the luminance s, and the decision module adjusts the luminance of the local lighting device provided to the user to a value greater than $D_{ld}^l(i)-s$. The decision module determines all the luminance provided by the local lighting devices, and stores the determined result in the matrix $A_{ld}$. $A_{ld}$ is an m×l matrix for representing the required luminance for the local lighting devices, and m' is the number of the local lighting devices.

Therefore, the decision module, based on the adaptive decision algorithm, determines target luminance $A_{wd}$ for the general lighting devices, and target luminance $A_{ld}$ for the local lighting devices. For example, a user demands local luminance range [700, 800], and the fixed sensor detects a general lighting device with luminance $A_{wd}$=300 Lux, the decision module only needs to adjust the local lighting device to $A_{ld}$=700−300=400 Lux. At this point, the portable carried by the user may detect the local luminance as 700 Lux, satisfying the user's minimum demands.

A solution may not exist for the adaptive decision algorithm for the general lighting devices in equation (2). For example, a user is currently reading, who needs a higher lamination, while a nearby user is sleeping, who demands lower luminance. Because there is no intersection between the demand ranges of the two users, equation (2) is unsolvable. Therefore, to avoid the above situation, a heuristic algorithm may be performed on the linear regression equation of equation (2), as shown in FIG. 7.

Figure 7:
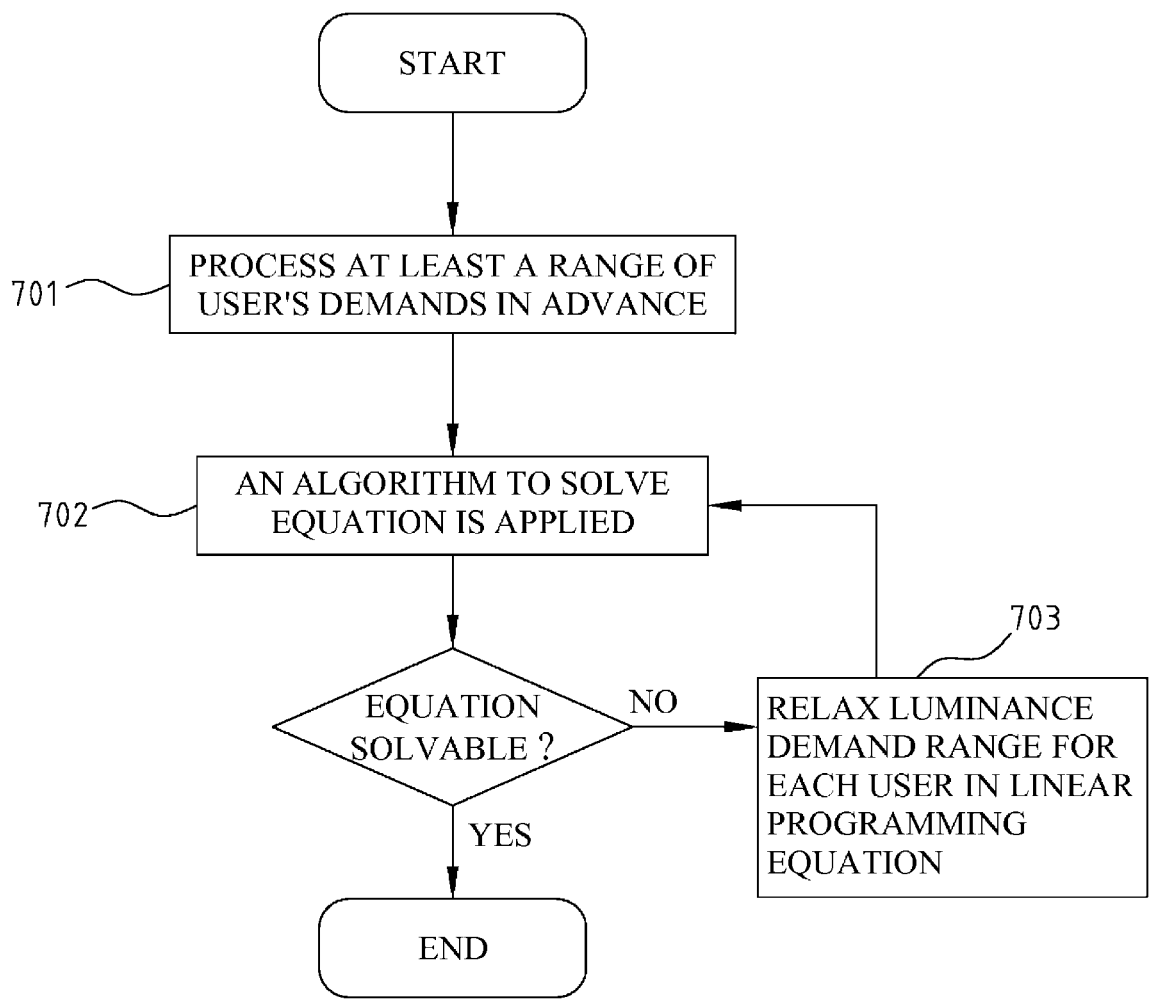
FIG. 7 shows a flowchart illustrating an exemplary trial-and-error algorithm, consistent with certain embodiments of the present disclosure.

Referring to FIG. 7, step 701 is to process at least a range of user's demands in advance. For example, for each virtual grid, check to see whether the user's demands in the virtual grid have any intersection. If the user's demands in the virtual grid have no intersection, the $R_i$ of user i in a smaller subset with less users may be modified so that the modified $R_i$ will not affect this virtual grid.

In step 702, an algorithm to solve equation (2) is applied. The algorithm may be any algorithm for solving a linear programming equation. If still no solution can be found, the conditions of the demand ranges for each user in equation (2) may be relaxed, as shown in step 703, followed by returning to step 702. If a solution is found, the process ends.

In step 703, the relaxation of the condition may be, for example, modifying the upper bound $D_{wd}^l(i)$ and the lower bound $D_{wd}^u(i)$ to $D_{wd}^l(i)-\alpha$ and $D_{wd}^u(i)+\alpha$, respectively, where $\alpha$ is a variable for controlling the precision and the convergence rate for the adjusting.

Figure 8A:
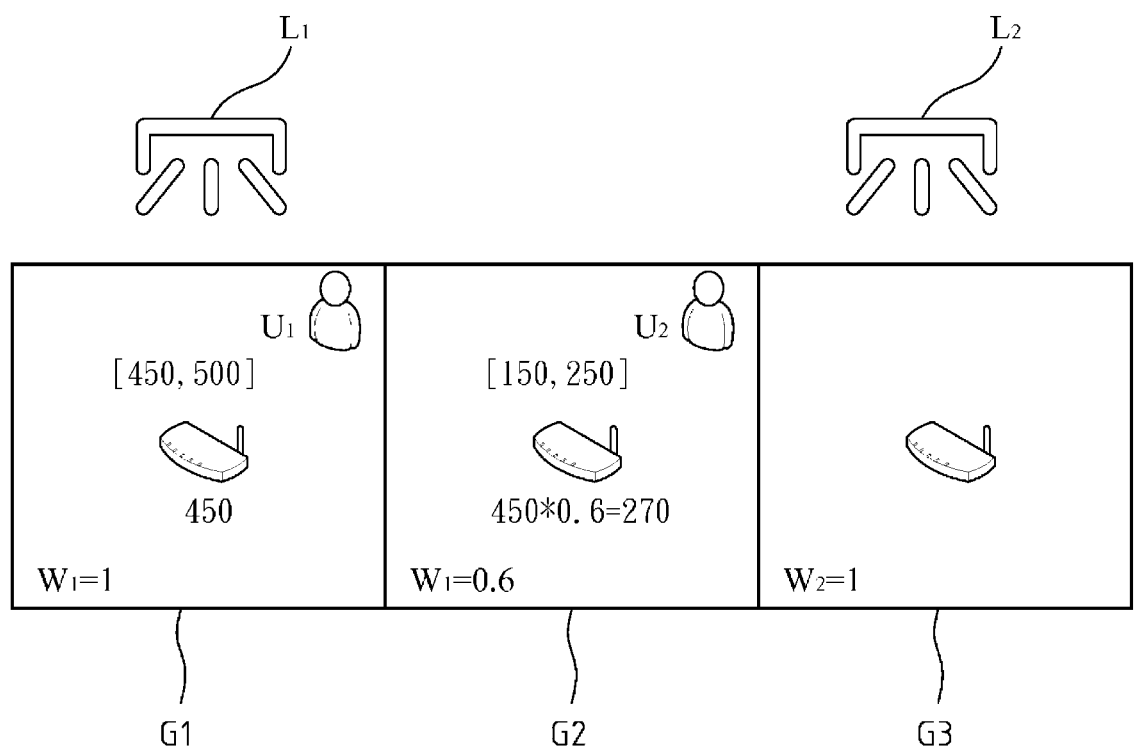
FIG. 8A shows an exemplary condition where the ranges of users' demands have no intersection and no solution may be obtained from the equation.

The following example explains the relaxation of the conditions of the user demands range in equation (2) to satisfy the demands for each user. FIG. 8A shows an exemplary condition where the ranges of users' demands have no intersection and no solution may be obtained from the equation. Referring to FIG. 8A, user $U_1$ in virtual grid $G_1$ demands the range of [450, 500], user $U_2$ in virtual grid $G_2$ demands the range of [150, 250]. A general lighting device $L_1$ has an effect weight $W_1$=1 on $G_1$, and an effect weight $W_1$=0.6 on $G_2$. Virtual grids $G_1$, $G_2$ are both affected by natural sunlight of 100 Lux.

Figure 8B:
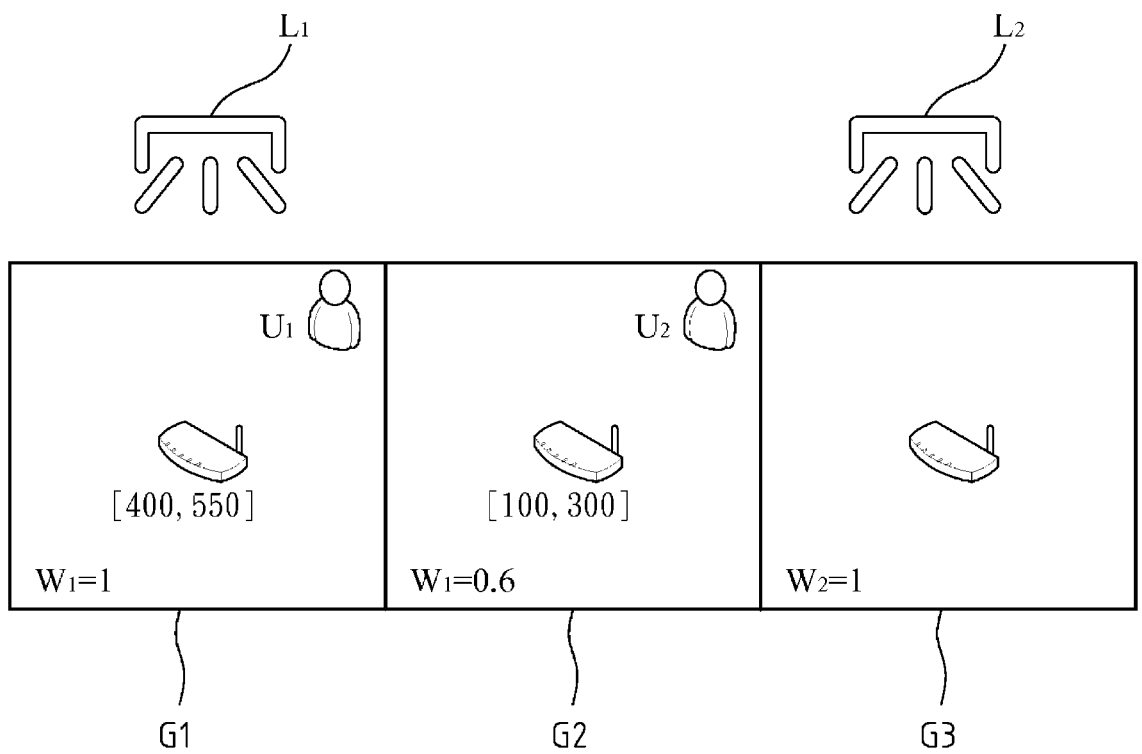
FIG. 8B shows an exemplary relaxation on the range of the users' demands on the luminance.

To satisfy user $U_1$, general lighting device $L_1$ is adjusted to 450 Lux. However, when general lighting device $L_1$ is adjusted to 450 Lux, virtual grid $G_2$ will receive 450*0.6=270 Lux luminance, which exceeds the range of user $U_2$ demands (250 Lux). In this case, after completing the in advance processing of step 701, the range of demands may be relaxed. FIG. 8B shows an exemplary relaxation for the range of the users' demands. Referring to FIG. 8B, the upper bound and the lower bound of the demand ranges of users $U_1$ and $U_2$ may be both relaxed for 50 Lux. Therefore, the demand range for user $U_1$ is modified as [400, 550], and the demand range for user $U_2$ is modified as [100, 300]. With the modification, when general lighting device $L_1$ satisfies the minimum demand of user $U_1$ by providing 400 Lux, virtual grid $G_2$ will receive 400*0.6=240 Lux luminance, which is also within the demand range of user $U_2$. In this case, equation (2) finds a feasible solution.

Through the above adaptive decision algorithm, how much more (or less) target luminance must be provided by all general lighting devices and local lighting devices may be found.

Referring back to step 601 and step 603 of FIG. 6, the target luminance $A_{wd}$ of general lighting devices and target luminance $A_{ld}$ of local lighting devices are adjusted, respectively. Based on both target luminance $A_{wd}$ and $A_{ld}$, the decision module may determine the adjustment. For example, the decision module may apply a binary search method to adjust the lighting devices to a target threshold. The relation between the adjustment calibration of the lighting devices and the luminance may also be obtained in advance by measurement.

Figure 9:
FIG. 9 shows an exemplary adjustment and control for the lighting devices through a binary search method, consistent with certain embodiments of the present disclosure.

FIG. 9 shows an exemplary adjustment and control for the lighting devices using a binary search method, consistent with certain embodiments of the present disclosure. Referring to FIG. 9, if the calibration range for adjusting a lighting device is 0-X, and the current calibration of the lighting device is x', the decision module may determine the luminance t is between x' and X to make the lighting device more illuminant. On the other hand, the decision module may determine the luminance t is between x' and 0 to make the lighting device more illuminant.

After the decision module generates the new x' and adjusts the lighting devices, the sensor re-detects the new luminance. The decision module refers to the weight and the reported luminance from the sensors to determine whether a target threshold is reached. If the target threshold is not reached, the decision module will determine again whether to increase or decrease the luminance for the lighting device, and determines a new t. The new t will be between x' and X or between x' and 0.

Figure 10:
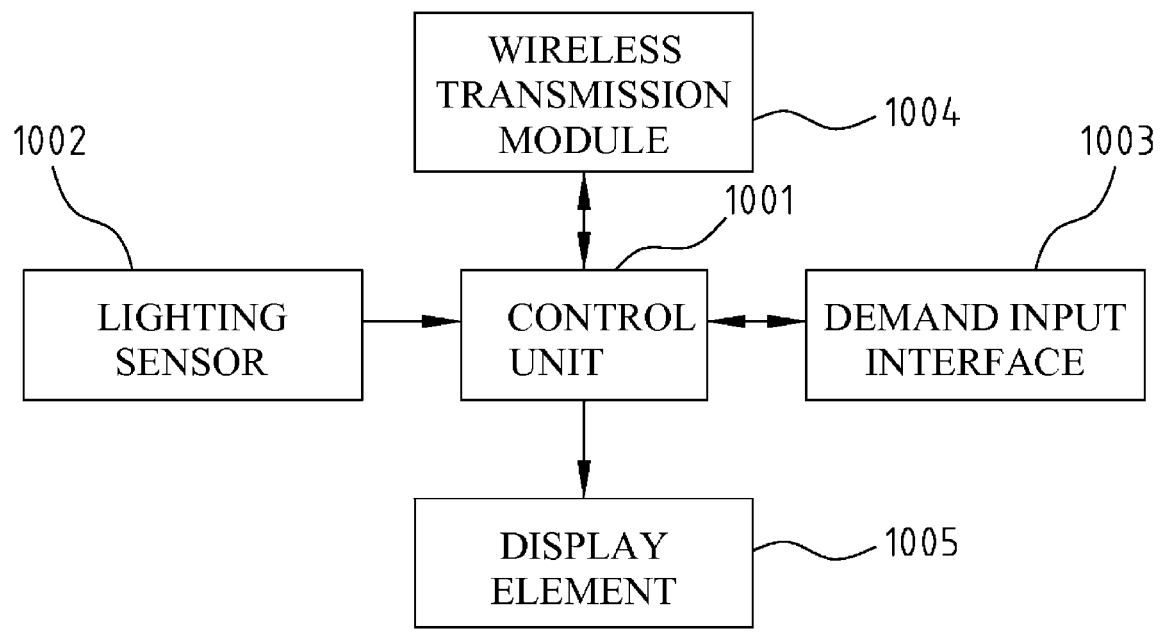
FIG. 10 shows a schematic view of an exemplary micro portable sensor, consistent with certain embodiments of the present disclosure.

In addition to reporting the local luminance to the decision module when the user moves, the portable sensor carried by the user may also allow the user to manually change the state. For example, the user may change the state from reading to sleeping, and the state change is transmitted by the portable sensor to the decision module. Then the decision module may automatically adjust the luminance of the lighting devices to meet the demands of the new state. The portable sensor may be embodied in various structures. FIG. 10 shows a schematic view of an exemplary micro portable sensor, consistent with certain embodiments of the present disclosure.

Referring to FIG. 10, the exemplary portable sensor may include a control unit 1001, a lighting sensor 1002, a demand input interface 1003, and a wireless transmission module 1004. Control unit 1001 receives the luminance detected by lighting sensor 1002. The user may use demand input interface 1003 to input their demands. Control unit 1001 transmits the detected luminance and the input demands through wireless transmission module 1004 to the decision module for adjusting the lighting devices to satisfy the demands. The portable sensor may further include a display element 1005, such as LCD, for displaying the detected luminance or related information.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An automatic lighting control system, comprising:
at least a lighting device, each of said at least a lighting device being adjustable and having a remote control function;
at least a sensor, said at least a sensor automatically configuring a wireless sensor network, and each of said at least a sensor detecting a corresponding luminance of a system environment; and
a decision module, said decision module receiving said luminance detected by said sensor through a wireless network, and adjusting each of said at least a lighting device in a remote dynamic decision mode according to system information, users' demands and said detected luminance by each of said at least a sensor;
wherein said at least a sensor is chosen from one of any combination of at least a fixed sensor and at least a portable sensor and is placed in one of a plurality of virtual grids formed by dividing said system environment for detecting the luminance in the corresponding virtual grid.

2. An automatic lighting control system, comprising:
at least a lighting device, each of said at least a lighting device being adjustable and having a remote control function;
at least a sensor, said at least a sensor automatically configuring a wireless sensor network, and each of said at least a sensor detecting a corresponding luminance of a system environment; and
a decision module, said decision module receiving said luminance detected by said sensor through a wireless network, and adjusting each of said at least a lighting device in a remote dynamic decision mode according to system information, users' demands and said detected luminance by each of said at least a sensor;
wherein said system information at least comprises information on each of said at least a lighting device, a relative weight of luminance of each of said at least a lighting device on each of said at least a sensor, information on said system environment, luminance demands of user's activities, and luminance effect extent for each of said at least a lighting device, said relative weight of a lighting device on a sensor being defined as a ratio of the luminance detected for the lighting device by the sensor in said system environment to the luminance detected for the lighting device by the sensor underneath the lighting device.

3. The system as claimed in claim 2, wherein said luminance demands of user's activities include defining a range of demand luminance.

4. An automatic lighting control system, comprising:
a plurality of lighting devices including at least a general lighting device and at least a local lighting device, each of said lighting devices being adjustable and having a remote control function;
at least a sensor, said at least a sensor automatically configuring a wireless sensor network, and each of said at least a sensor detecting a corresponding luminance of a system environment; and
a decision module, said decision module receiving said luminance detected by said sensor through a wireless network, and adjusting each of said lighting devices including said at least a general lighting device for illuminating a global environment and said at least a local lighting device for illuminating a specific spot in a remote dynamic decision mode according to system information, users' demands and said detected luminance by each of said at least a sensor;
wherein said at least a sensor is chosen from one of any combination of at least a fixed sensor and at least a portable sensor, said at least a portable sensor includes a control unit, a lighting sensor, a demand input interface and a wireless transmission module, said control unit receives luminance detected by said lighting sensor, a user uses said demand input interface for inputting demands on luminance, and said control unit transmits said detected luminance and said demands of the user to said decision module through said wireless transmission module.

5. An automatic lighting control system, comprising:
at least a lighting device, each of said at least a lighting device being adjustable and having a remote control function;
at least a portable sensor, said at least a portable sensor automatically configuring a wireless sensor network, and each of said at least a portable sensor including a control unit, a lighting sensor, a demand input interface and a wireless transmission module, and detecting a corresponding luminance of a system environment; and
a decision module, said decision module receiving said luminance detected by said at least a portable sensor through a wireless network, and adjusting each of said at least a lighting device in a remote dynamic decision mode according to system information, users' demands and said detected luminance by each of said at least a portable sensor;
wherein said control unit receives luminance detected by said lighting sensor, a user uses said demand input interface for inputting demands on luminance, and said control unit transmits said detected luminance and said demands of the user to said decision module through said wireless transmission module.

6. A method for controlling luminance for an automatic lighting control system, applicable to a system environment in which a user moves or changes demands on luminance, said method comprising:
pre-storing system information, user information, and luminance reported by at least a sensor and determining the luminance required to be provided by at least a general lighting device of said system environment;

dynamically adjusting each of said at least a general lighting device;

determining the luminance required to be provided by at least a local lighting device of said system environment, and adjusting each of said at least a local lighting device; and receiving luminance detected and reported from each of said at least a sensor and determining whether a target threshold of luminance is reached; if not, repeating the above steps until said target threshold of luminance is reached.

7. The method as claimed in claim 6, wherein said adjusting each of said at least a general lighting device and each of said at least a local lighting device is through a binary search method.

8. The method as claimed in claim 6, wherein said determining the luminance required to be provided by each of said at least a general lighting device and each of said at least a local lighting device is through a linear programming equation to satisfy each user's demands and determining the luminance satisfying the minimum demands of each user.

9. The method as claimed in claim 8, wherein said linear programming equation applies a trial-and-error algorithm to solve said linear programming equation.

10. The method as claimed in claim 9, wherein said trial-and-error algorithm includes:

processing in advance at least a user's luminance demand range in said linear programming equation;

solving said linear programming equation through an algorithm; and if said linear programming is unsolvable, relaxing said luminance demand range of each user in said linear programming equation and returning to said step of solving said linear programming equation.

\* \* \* \* \*